Figure 1:
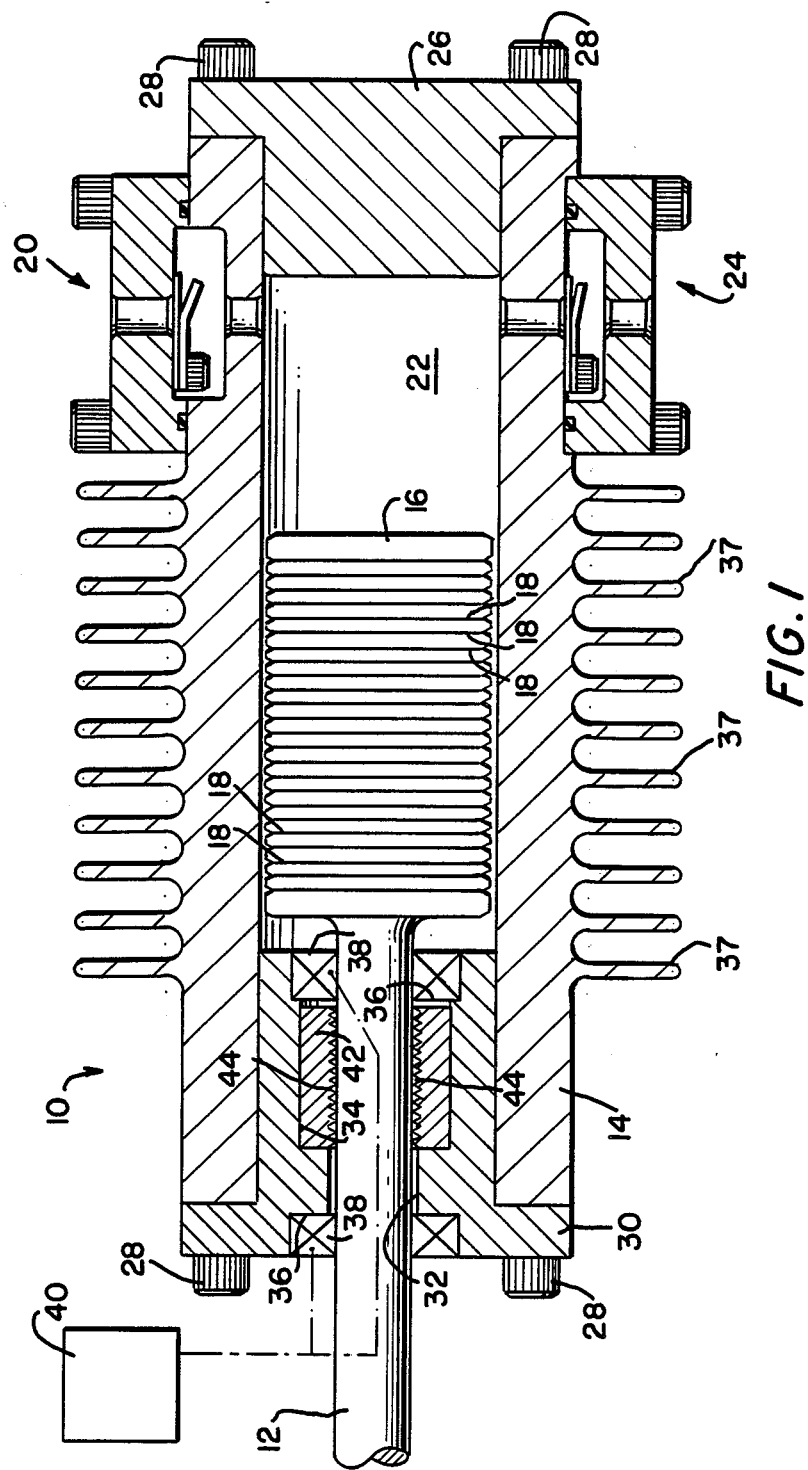

United States Patent [19]

Miller

[11] Patent Number: 4,889,039

[45] Date of Patent: Dec. 26, 1989

[54] GAS COMPRESSOR WITH LABYRINTH SEALING AND ACTIVE MAGNETIC BEARINGS

[76] Inventor: Bernard F. Miller, 154 Pritchard Ave., Corning, N.Y. 14830

[21] Appl. No.: 258,643

[22] Filed: Oct. 17, 1988

[51] Int. Cl.$^4$ .............................. F01B 9/02; F16J 15/16
[52] U.S. Cl. ................................ 92/140; 92/162 R; 92/165 R; 92/166; 277/53; 277/214; 277/215; 310/90.5
[58] Field of Search ................. 92/162 R, 165 R, 166, 92/DIG. 1, DIG. 2, 140; 310/90.5; 277/53, 214, 215

[56] References Cited

U.S. PATENT DOCUMENTS

| | | | |
|---|---|---|---|
| 17,855 | 7/1857 | Gale | 92/162 R X |
| 2,878,990 | 3/1959 | Zürcher | 92/162 R X |
| 3,422,765 | 1/1969 | Schoch | 417/418 |
| 3,731,984 | 5/1973 | Habermann | 310/90.5 |
| 4,304,410 | 12/1981 | Erickson et al. | 92/162 R X |
| 4,389,849 | 6/1983 | Gasser et al. | 310/90.5 X |
| 4,627,795 | 12/1986 | Schmitz-Montz | 92/162 R X |

FOREIGN PATENT DOCUMENTS 1403763 1/1969 Fed. Rep. of Germany ........ 92/166

OTHER PUBLICATIONS

Société de Mécanique Magnétique, Actidyne, Application of Active Magnetic Bearings to Industrial Rotating Machinery.
NASA, Magnetic Bearing with Active Control, 9/1981.

Primary Examiner—Robert E. Garrett
Assistant Examiner—Mark A. Williamson
Attorney, Agent, or Firm—Bernard J. Murphy

[57] ABSTRACT

The invention, a high-pressure, reciprocating, gas compressor, employs labyrinths to create gas sealing, annular, air dams between the piston and cylinder bore, and piston rod and an aperture in an end wall or closure of the cylinder through which the rod translates, and active magnetic bearings to maintain the piston and rod at their centroids, equally and minutely spaced, fully thereabout, within the bore and aperture. Too, the drive mechanism, a scotch yoke arrangement, has further, active magnetic bearings, to centralize a drive shaft in its housing, and to effect a non-contacting travel of the drive shaft's offset crank, which translates the piston rod, within the yoke.

8 Claims, 3 Drawing Sheets

GAS COMPRESSOR WITH LABYRINTH SEALING AND ACTIVE MAGNETIC BEARINGS

This invention pertains to gas compressors, and in particular to a high-pressure, non-lubricated, reciprocating gas compressor in which the relatively moving components thereof are non-contacting.

State of the art reciprocating compressors commonly depend on mechanical devices for the sealing of gas pressures between a piston and compression cylinder bore, and between a piston rod and a cylinder end wall or closure, such as piston rings or packing rings. These devices have a very short life, due to rubbing friction, especially at higher pressures. The wear rate is even greater if the compressor has no oil, water, or similar lubrication. Therefore, it has been necessary for the speed of the reciprocating piston to be restricted, to reduce heat and the resulting wear. Restricted speed, in turn, reduces the output capacity of any given compressor. Excessive clearances, caused by frictional heat, and the heat of compression, cause excessive leakage and poor efficiency. Too, noise is generated in the cylinder due to the "kick" or "piston slap" of the piston and rod assembly as it changes direction.

Now, it is well known to employ labyrinth-type sealing means, in lieu of piston rings or packing rings, and the like. But the efficiency thereof is limited unless it is possible to maintain a piston, and piston rod, in their true centroid positions. If this can be done, then labyrinth sealing for the piston and rod can be held to very minute clearances, will be extremely efficient, and provide non-contacting, i.e., essentially non-wearing, operating components.

It is an object of this invention to show that state of the art, active, magnetic bearings can be used to position a piston and rod at their centroids equidistant from the cylinder bore and end wall aperture and, thus, allow a very closely-fitted piston, with convoluted grooves, to form a labyrinth seal with the bore, to form an air dam, and seal gases at pressures up to very high levels, without any contact between the two parts. This will eliminate wear, and allow significant increase in the speed of the compressor. The resulting increase in speed will improve sealing, increase efficiency, and eliminate size problems by allowing much smaller pistons, and shorter strokes, for a given capacity. Wear can be essentially eliminated in normal operation, and heat will be reduced to only the heat of compression. Noise will be reduced too, by eliminating the "piston slap and chucking" action of mechanical seal devices. Too, less parts will be required. The invention will also show that rods can be sealed in the same manner, with convolutes in the bore or aperture in which it translates, or in the rod, with centroid positioning thereof by means of active magnetic bearings.

Figure 2:
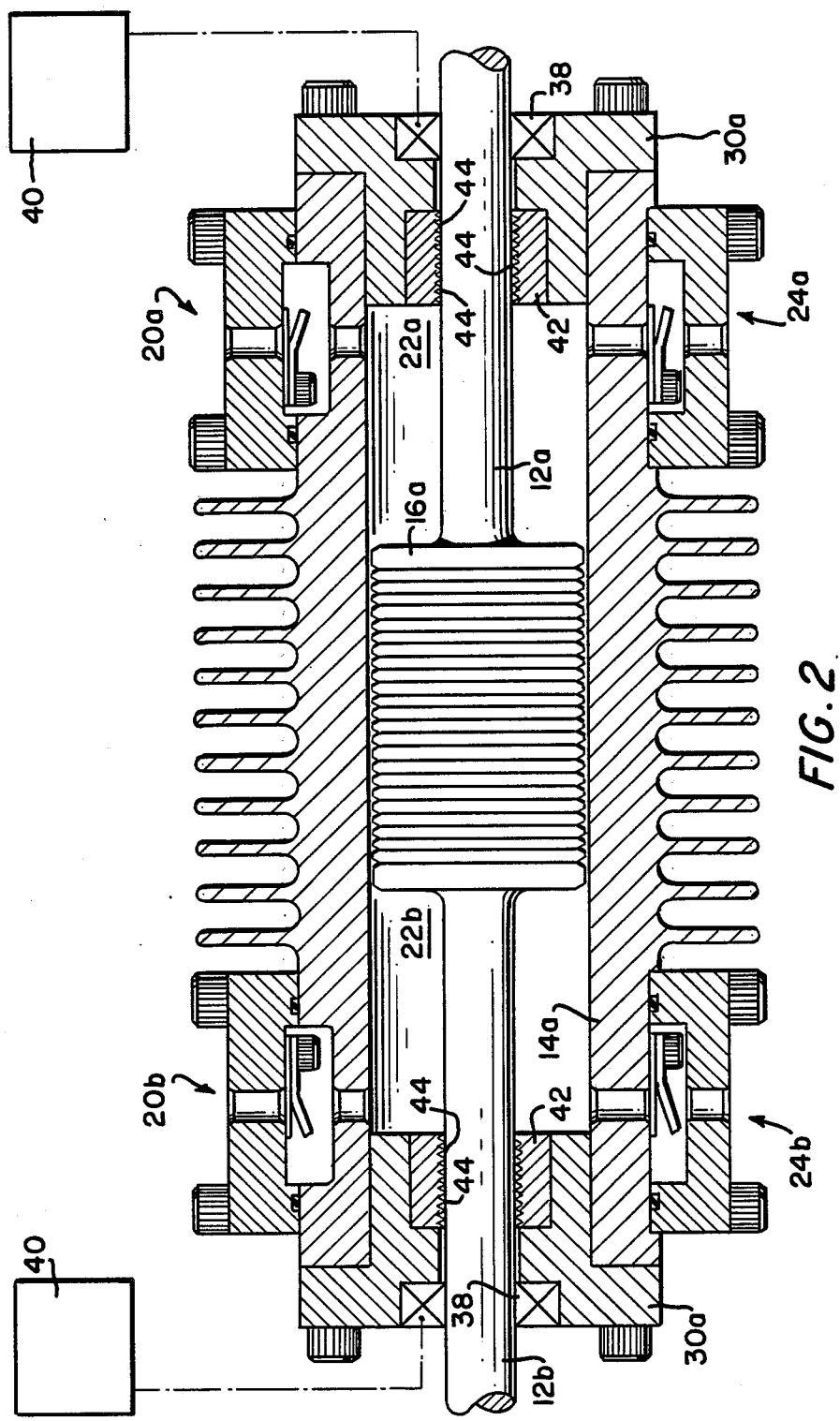

It is particularly an object of this invention to set forth a gas compressor, of the reciprocating-piston type, comprising a cylinder having an inner, bore surface; and a piston, reciprocably disposed in said cylinder; wherein said piston has an outer, cylindrical surface; one of said surfaces has means, cooperative with the other of said surfaces, for creating a gas sealing, annular, air dam between said surfaces; said piston has a rod extending therefrom; said cylinder has a closure or wall, at an end thereof, with an aperture formed therein and centrally thereof; said rod is in penetration of said aperture; and further including means interpositioned between said rod and said aperture for suspending said rod, non-contactingly, in said aperture. Further objects of this invention, as well as the novel features thereof, will become more apparent by reference to the following description, taken in conjunction with the accompanying figures, in which: FIG. 1 is a cross-sectional view, taken along the translating axis of an embodiment of the invention in the form of a single-acting piston arrangement;

FIG. 2 is an illustration like that of FIG. 1, but of an alternative embodiment of the invention in the form of a double-acting piston arrangement.

Figure 3:
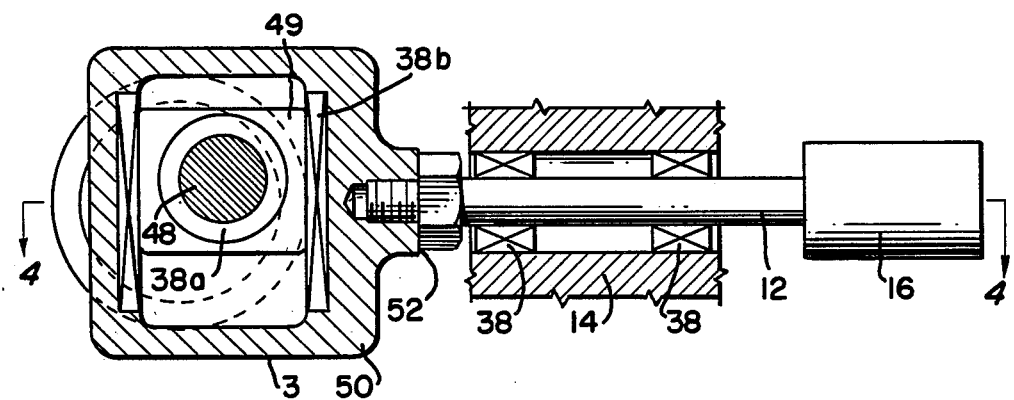
Figure 4:
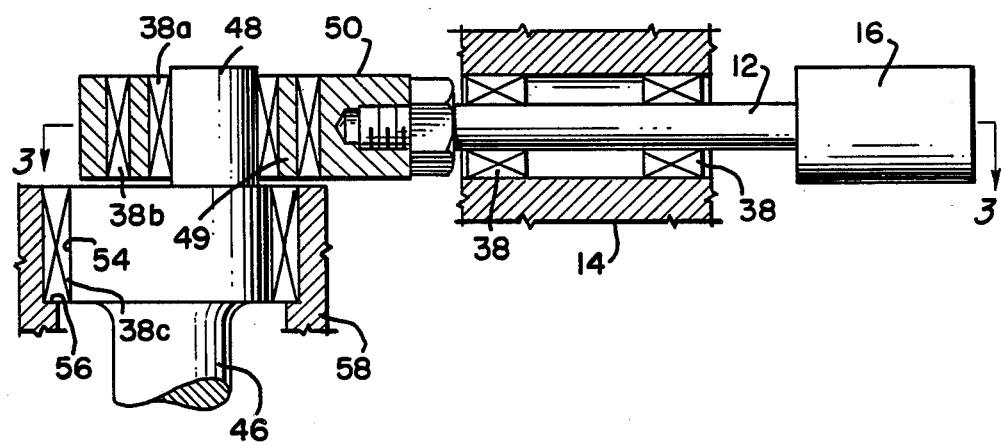

FIG. 3 is a cross-sectional view of a scotch-yoke drive mechanism, for use with either the embodiment of FIG. 1 or 2, comprising a further aspect of the invention, the same having been taken, generally, along section 3—3 of FIG. 4; and FIG. 4 is a cross-sectional view taken, generally, along section 4—4 of FIG. 3. FIG. 1 illustrates a typical "single acting" piston compressor 10 with a piston rod 12, projecting from one end, which is connected to a drive mechanism subsequently to be described in connection with FIGS. 3 and 4. This illustration shows an air cooled compressor cylinder 14, but, clearly, it could alternatively be water cooled. Contained with the cylinder 14 is a piston 16 having a multiplicity of convoluted grooves 18 on the outside surface thereof. When driven by a mechanism, in a reciprocating manner, gas is introduced through a suction valve 20 which allows the gas to be compressed in the compartment 22 and discharged through the valve 24. One end of cylinder 14 is sealed by a head 26 fixed by bolts 28. The other end of the cylinder 14 is closed by a head 30 having an aperture 32, a recess 34, and shoulders 36 formed therein. Convoluted fins 37 are formed on cylinder 14 to allow a dissipation of heat generated by compression of gas. The piston grooves 18 form a labyrinth-type seal as the piston 16 reciprocates, and a pressure drop occurs creating minimal leakage past the piston 16 because of its close fit in the cylinder 14. The close fit is maintained by active, magnetic bearings 38 set in the shoulders 36. Remote, electrical control 40 monitors the bearings-to-rod interface to position the rod 12 and piston 16 extremely close to their respective, true centers within the bore of the cylinder 14 and the aperture 32; they are maintained in this position during piston reciprocation, regardless of external, lateral forces on the piston 16 and/or rod 12.

By way of definition, magnetic bearings are those known components which are designed to suspend a moving element, such as a piston, with a minute clearance thereabout within a fixed structure, such as a cylinder. An active magnetic bearing is the known component which is responsive, through control circuitry, to lateral deviations or displacements of the moving element (due to given forces), to cause the element to return to its optimum positioning spaced from (i.e., centrally in) the wall or bore of the host structure. Such active magnetic bearings are disclosed and discussed, for instance, in U.S. Pat. No. 3,371,984, issued to H. Habermann, on May 8, 1973, for a "Magnetic Bearing Block Device for Supporting a Vertical Shaft Adapted for Rotating at High Speed"; NASA Tech Briefs, Summer, 1981, "Magnetic Bearing with Active Control"; and the published brochure: "Actidyne; Application of Active Magnetic Bearings to Industrial Rotating Machinery", Societe de Mecanique Magnetique. The teachings in the aforesaid literature are incorporated herein by reference, and define the nature of the control 40 and bearings 38 arrangement. Control 40 responds to unwanted lateral displacements of the rod 12 and piston 16, relative to the aperture 32 and cylinder bore, respectively, to return the same to optimum, centroid positioning.

The recess 34 nests an insert 42 of cylindrical configuration having a bore formed with a multiplicity of grooves 44. The latter function like grooves 18 to create an air dam around the rod 12 to seal the rod-to-insert interfacing space against gas leakage therealong.

An alternative version of the invention, in FIG. 2, shows a "double acting" cylinder 14a with compression chambers 22a and 22b, and suction and discharge valves 20a, 20b, 24a and 24b at opposite ends. Also shown are the piston 16a and rods 12a and 12b at both ends. All other structures in FIG. 2, which bear same or similar index numbers as structures in FIG. 1, are the same or similar, in purpose and/or function, as those in FIG. 1.

Most any, commonly-known type of drive mechanism can be used, such as a slider crank, wobble or swash plate, scotch yoke or cam/eccentric operation.

FIG. 3 and 4 depict a scotch-yoke type of drive mechanism which, in a further aspect of the invention, teaches a novel employment of the active magnetic bearings.

A drive shaft 46 has an offset crank pin 48 about which is mounted an active magnetic bearing 38a. The pin 48 and bearing 38a, in response to rotation of the shaft 46, travel, with a floating member 49, through the yoke 50, there being another active magnetic bearing 38b between member 49 and yoke 50. With the travel, the bearing 38a maintains a fine clearance between it and the walls of the member 49, and bearing 38b maintains a fine clearance between the member 49 and the walls of the yoke 50. Hence, the bearing 38a (pin 48, and member 49, of course) translate the yoke 50, but never contact it. The yoke 50 is coupled, at 52, to the rod 12 (which corresponds to the rod 12 in FIG. 1).

Shaft 46 has a circular land 54 which receives thereabout another active magnetic bearing 38c. The latter is set within a recess 56 provided therefor in a housing 58, and maintains the land in a minutely spaced, non-contacting disposition relative to the recess 56.

While I have described my invention in connection with specific embodiments thereof, it is to be clearly understood that this is done only by way of example, and not as a limitation of the scope of the invention as set forth in the objects thereof and in the appended claims.

I claim:

1. A gas compressor, of the reciprocating-piston type, comprising:
   a cylinder having an inner, bore surface; and
   a piston, reciprocally disposed in said cylinder; wherein
   said piston has an outer, cylindrical surface;
   one of said surfaces has means, cooperative with the other of said surfaces, for creating a gas sealing, annular, air dam between said surfaces;
   said piston has a rod extending therefrom;
   said cylinder has a closure or wall at an end thereof, with an aperture formed therein and centrally thereof;
   said rod is in penetration of said aperture; and further including
   means interpositioned between said rod and said aperture for suspending said rod noncontactingly in said aperture;
   a rotary drive shaft having an offset crank pin;
   a yoke circumjacent said pin;
   means coupling said yoke to said rod;
   an active magnetic bearing interpositioned between said yoke and said pin;
   a floating member (a) confined within said yoke, and (b) circumjacent said pin, being interpositioned between said pin and said yoke;
   a second active magnetic bearing interpositioned between said member and said yoke; wherein
   said pin causes said member to translate, within said yoke, transverse to said rod; and
   said bearings noncontactingly suspend (a) said pin in said member, and (b) said member in said yoke.

2. A gas compressor, according to claim 1, wherein: said air dam creating means comprises a labyrinth.

3. A gas compressor, according to claim 1, wherein: said rod and said aperture have mutually complementary, surfaces; and
   one of said complementary surfaces has means; cooperative with the other thereof, for creating another, gas sealing, annular air dam therebetween.

4. A gas compressor, according to claim 3, wherein: said another air dam creating means comprises a labyrinth.

5. A gas compressor, according to claim 3, wherein: said aperture has a multiplicity of annular grooves formed therein.

6. A gas compressor, according to claim 1, wherein: said rod suspending means comprises an active magnetic bearing.

7. A gas compressor according to claim 1, wherein: said rod suspending means comprises a pair of active magnetic bearings, set in said closure or wall, in spaced apart disposition.

8. A gas compressor, according to claim 1, wherein: said outer, cylindrical surface of said piston has a multiplicity of annular grooves formed therein.

* * * * *